United States Patent
Von Bebenburg

[11] 3,917,585
[45] Nov. 4, 1975

[54] NEW AZA-10,11-DIHYDRO-5H-DIBENZO[B,E]-[1,4]-DIAZEPINE

[75] Inventor: Walter Von Bebenburg, Buchschlag, Germany

[73] Assignee: Deutsche Gold- und Silber-Scheideanstalt vormals Roessler, Germany

[22] Filed: Sept. 4, 1973

[21] Appl. No.: 394,396

[30] Foreign Application Priority Data
Sept. 6, 1972 Austria .................... 7644/72

[52] U.S. Cl... 260/239.3 T; 260/268 T; 260/293.59; 260/296 T; 260/247.5 GP; 424/248; 424/250; 424/263; 424/267
[51] Int. Cl.² .................... C07D 471/04
[58] Field of Search... 260/239.3 T, 296 T, 247.5 R, 260/293.69, 268 TR, 293.59, 239 BC, 242.5 GP

[56] References Cited
UNITED STATES PATENTS
3,406,168  10/1968  Schmidt .................... 260/239.3 T Primary Examiner—Norma S. Milestone
Assistant Examiner—Robert T. Bond
Attorney, Agent, or Firm—Cushman, Darby & Cushman

[57] ABSTRACT
Aza-10,11-dihydro-5H-dibenzo[b,e]-[1,4]diazepines are prepared of the formula

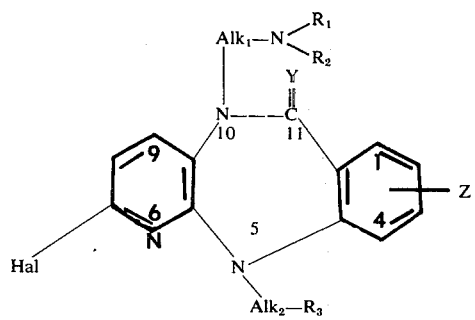

where $Alk_1$ and $Alk_2$ are alkylene groups of 1 to 6 carbon atoms, $R_1$ and $R_2$ are alkyl groups of 1 to 5 carbon atoms which also together with the nitrogen atom can form a 4- to 7-membered ring which can include an oxygen atom, a sulfur atom, a further >NH or >NR group where R is an alkyl group of 1 to 5 carbon atoms, $R_3$ is hydrogen, a hydroxyl group, a cycloalkyl group with 3 to 6 carbon atoms or a halogen atom, Hal is a halogen atom, Y is an oxygen atom or sulfur atom or an NH group and Z is a hydrogen atom, an alkyl group with 1 to 5 carbon atoms, a halogen atom, a hydroxy group, a nitro group or an —OR group or pharmacologically acceptable salts thereof. The compounds are useful in treating ulcers, e.g. stomach and duodenal ulcers and as antihistamics and antidepressives.

14 Claims, No Drawings

NEW AZA-10,11-DIHYDRO-5H-DIBENZO[B,E]-[1,4]-DIAZEPINE

The present invention is directed to aza-10,11-dihydro-5H-dibenzo[b,e]-[1,4]diazepines of the formula

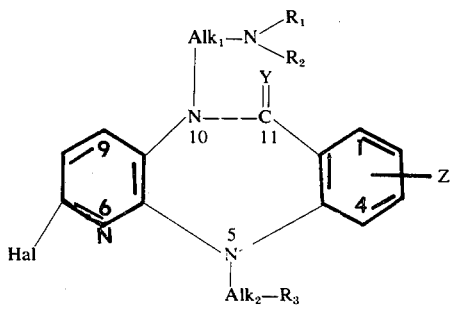

I where $Alk_1$ and $Alk_2$ are alkylene groups of 1 to 6 carbon atoms, $R_1$ and $R_2$ are alkyl groups of 1 to 5 carbon atoms which also together with the nitrogen atom can form a 4-to 7-membered ring which can include an oxygen atom, a sulfur atom, a further >NH or >NR group where R is an alkyl group of 1 to 5 carbon atoms, $R_3$ is hydrogen, a hydroxyl group, a cycloalkyl group with 3 to 6 carbon atoms or a halogen atom, Hal is a halogen atom, Y is an oxygen atom or sulfur atom or an NH group and Z is a hydrogen atom, an alkyl group with 1 to 5 carbon atoms, a halogen atom, a hydroxy group, a nitro group or an —OR group or pharmacologically acceptable salts thereof.

The halogens are preferably fluorine, chlorine and bromine, i.e. halogens of atomic weight 9 to 80, especially fluorine and chlorine. The above-mentioned lower alkyl groups can be straight or branched chain and preferably consist of 1 to 4 carbon atoms. Examples of these types of alkyl group are methyl, ethyl, isopropyl, propyl, butyl, t-butyl, sec. butyl, isobutyl, amyl. Heterocyclic rings which can be formed from $R_2$ and $R_3$ include, for example, piperidinyl, pyrrolidinyl, morpholino, piperazinyl or homopiperazinyl.

Examples of cycloalkyl groups are cyclopropyl, cyclopentyl, cyclohexyl; in combination with $Alk_2$ these include cyclohexylpropyl, cyclopropyl methyl, cyclohexylpentyl, cyclopentylethyl.

The alkylene groups $Alk_1$ and $Alk_2$ can be straight or branched chain and inside one molecule can be the same or different.

The compounds of the invention have valuable pharmacodynamic properties. They are effective, for example, as antihistamics, antidepressives and anti ulcer compounds.

The salts of the invention are also useful as curing agents for melamine-formaldehyde resins.

The compounds of the invention can be prepared by methods known of themselves. Thus a. there can be introduced into a compound of formula I where the group $Alk_1$-$NR_1R_2$ and/or the group $Alk_2R_3$ is replaced by hydrogen, either the group $Alk_1$-$N_1R_2$ or the group $Alk_2R_3$ or both groups can be added in succession; or b. a compound of formula I wherein either the bond between the number 5 nitrogen atom to one or both 6-membered rings is open, while this nitrogen atom has a hydrogen atom attached thereto and a halogen atom, e.g. chlorine or bromine is found in the corresponding position of one or both 6-membered rings, or the bond of the number 10 nitrogen atom to the number 11 carbon atom is opened, while the number 10 nitrogen atom has a hydrogen atom attached thereto, and the number 11 carbon atom together with Y is replaced by the constituent group —CYOH, which also can be present in an activated form, is cyclized to the 7-membered ring; or c. in a compound of the formula

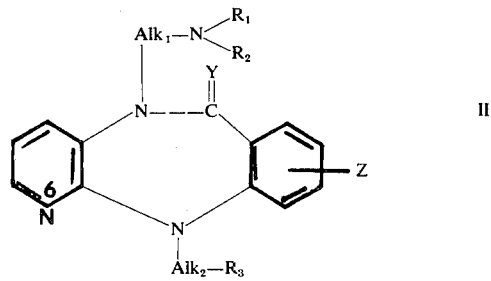

II wherein the pyridine nitrogen (6-position) can also be present in the form of the nitrogen oxide, and Y, Z, $Alk_1$, $Alk_2$ and $R_1$, $R_2$ and $R_3$ are as defined above, there is introduced into the 7-position a halogen atom either directly or first an amino group, a substituted amino group, a hydroxyl group or a substituted hydroxyl group is introduced and this group subsequently exchanged for the halogen atom and in a given case, a nitrogen oxide group present in the pyridine ring is changed back to a trivalent pyridine nitrogen; and in a given case, a compound of formula I, where Y is oxygen or NH, is changed to sulfur by reaction with inorganic sulfides, e.g. sodium sulfide, or where Y is S or NH is changed to 0 by reaction with inorganic oxides, hydrogen peroxide or hydrogen peroxide derivatives or when Y or 0 or S is changed to NH by reaction with $NH_3$ or $NH_3$ materials.

Process (a) can be carried out in solvents or suspending agents at temperatures between —70° and +200°C., using halogenides of the formula X-$Alk_1$-$NR_1R_2$ or X-$Alk_2R_3$, where X is chlorine or bromine (halogen of atomic weight 35 to 80). As solvents there can be used, for example, dimethyl formamide, dimethyl sulfoxide, bioxane, benzene, tetrahydrofurane, toluene, acetone, lower aliphatic alcohols such as methanol, ethanol, propanol and isopropanol or ether alcohols such as diethylene glycol or dipropylene glycol. Suitably the reaction is carried out in the presence of an acid acceptor, as, for example, sodamide, sodium hydride, or finely divided sodium (in an inert solvent) or potash, sodium carbonate, tertiary amines such as triethylamine, diisopropylmethyl amine or pyridine. Process (a) can, in a given case, also be changed as follows: Instead of reacting with a compound X-$Alk_1NR_1R_2$, under the same conditions there is first reacted a compound X-Alk —$NR_1R_2$, where X is the same or different and is chlorine or bromine, and subsequently there is reacted an amine $HNR_1R_2$. In the case where $R_3$ is a hydroxyl group in the 2-position of $Alk_2$, there can be used in place of the halogen compound either ethylene oxide or ethylene oxide which is substituted with a 1 to 4 carbon atom alkyl group.

Process (b) can be carried out without a solvent by heating to 100° to 280°C., or in a solvent at a temperature between 80° and 250°C. in a given case, with addition of a condensation agent. As solvents, there can be used, for example, aliphatic alcohols (methanol, ethanol, isopropanol, propanol), dioxane, dimethyl formamide, benzene, toluene, glacial acetic acid, polyphosphoric acid or concentrated sulfuric acid, wherein the last two acids at the same time produce condensation agents which can also be used with other solvents. As condensation agents there can be used $ZnCl_2$, pyridine hydrochloride, strong acids such as HCl, HBr, toluene sulfonic acid, trifluoroacetic acid, trichloroacetic acid, as well as dehydrating agents such as dicyclohexylcarbodiimide, 1,1-carbonyl-diimidazole, N-ethoxycarboxy-2-ethoxy-1,2-dihydroquinoline, etc. As the halogen atom which reacts in process (b), chlorine or bromine is especially preferred.

In case the 7-membered ring is closed by way of the —CYOH, the —CYOH group can also be added in an activated form. As activated forms there can be used the customary functional modification of carboxyl or thiocarbyl group to form activated forms. Such activated forms of the group —CYOH are, for example, the group —CYHal (Hal is a halogen atom, especially Cl or Br), the group —CYOR (R is an alkyl group up to 6 carbon atoms, in a given case, a substituted phenyl group or benzyl), the groups —CN, —$CON_3$ and the like. The cyclization takes place, for example, with the elimination of water, an alcohol, HOR or hydrogen halide.

Process (c) can be carried out at temperatures between —20° and +200°C. As the solvent there can be used water, aliphatic alcohols such as methanol, ethanol, isopropanol and butanol, acetone, glacial acetic acid, phosphoric acid, sulfuric acid, or excess reagents such as phosphorus halides or sulfur halides, for example phosphorus oxychloride, $PCl_5$, thionyl chloride or hydrofluoric acid.

In detail, there can be reacted a compound of formula II with an alkaliamide, e.g. sodamide, under the conditions of the Tschitschibabin reaction and thereby introduce an amino group in the 7-position (2-position of the pyridine ring); this can be diazotized and the diazonium group replaced by halogen in known manner. The Tschitschibabin reaction takes place in solvents such as toluene, benzene, dimethyl aniline, etc. at temperatures between 100° and 250°C. The diazotization is carried out in polar solvents such as water, alcohols, e.g. ethyl alcohol, dimethyl formamide, etc. at temperatures around 0°C., the replacement of the diazonium group by halogen through addition of excess hydrogen halide, e.g. HCl or HBr, to the diazo solution and heating to temperatures up to 100°C. or by reaction according to the conditions of the Sandmeyer reaction or modified Sandmeyer reaction in the presence of fluoride or bromide ions and/or corresponding copper (I) salts (CuBr, CuCl) or fluoborate ions with heat. As solvents suitable for this there are used water-alcohol mixtures (e.g. water-ethanol), or mixtures of water, dimethyl formamide and dimethyl sulfoxide. For the production of fluorine derivatives there can also be used decomposed thermally diazonium fluoborates. The introduction of the fluorine atom in the 7-position can also take place in a modified manner by gradually adding $NaNO_2$ to a solution in concentrated aqueous hydrofluoric acid of a compound of formula II having an amino group in the 7-position at temperatures between 0° and 50°C., or introducing a slow stream of nitrous gases.

In compounds of formula II which contain an amino group in the 7-position, the latter can be replaced by a hydroxyl group by the action of nitrous acid. This hydroxyl group can then in turn be halogenated, especially brominated, by a halogenating agent such as phosphorus oxytrihalides, phosphorus pentahalides, thionyl halides (for example, $POBr_3$, $PBr_5$, $SOBr_2$), in a given case in an inert medium between 20° and 250°C.

The compound II can also be directly halogenated, especially if the halogen is chlorine by treating compound II in a solvent such as a halohydrocarbon, e.g. carbon tetrachloride, dichloroethane, etc.; or in suspension in water or in the substance itself (for example, molten) with elemental chlorine or mixtures of alkali chlorates, e.g. sodium chlorate or potassium chlorate with hydrochloric acid. The temperatures for this procedure are between 50° and 250°C.

Those compounds of Formula II which have the N-oxide group in the 6-position can be reacted with halogenating agents such as phosphorus oxyhalides, phosphorus pentahalides or thionyl halides ($POCl_3$, $PCl_5$, $SOCl_2$). In such cases, there is used either an excess of the halogenating agent or the reaction is carried out in solvents such as benzene, toluene, or halohydrocarbons at temperatures between 0° and 150°C. Thereby the halogen atom is introduced into the still free 2-position of the pyridine ring and the N-oxide group changed back to the trivalent pyridine nitrogen atom.

The exchange of the substituents Y can be carried out at temperatures between —40° and +200°C; as solvents there can be used, for example, toluene, benzene, pyridine, lower aliphatic alcohols such as methanol, ethanol, isopropanol and propanol, as well as acetone, dioxane, tetrahydrofurane or also liquid ammonia. As reagents there can be used for the introduction of sulfur, phosphorus pentasulfide; for exchanging the sulfur to oxygen, $H_2O_2$, nitric acid, nitrous gases and heavy metal oxides such as mercury oxide, silver oxide, and manganese dioxide; for exchanging NH to oxygen, water or dilute aqueous acids; for introduction of NH, ammonia.

Basic compounds of general formula I can be converted by known methods into their salts. The free bases can be produced from the salts in customary manner, for example, by treating a solution in an organic medium, (e.g. aliphatic alcohols such as methanol and ethanol) with aqueous soda, ammonia or soda lye. As anions for these salts there can be used acid residues known to be pharmacologically acceptable.

Thus, there can be prepared, for example, salts with acids such as hydrochloric acid, hydrobromic acid, succinic acid, tartaric acid, fumaric acid, sulfuric acid, citric acid, phosphoric acid, lactic acid, malonic acid, maleic acid, acetic acid, propionic acid, p-toluene-sulfonic acid.

The compounds of formula I which contain asymmetrical carbon atoms and as a rule are formed as racemates can be split into the optically active isomers in known manner, for example, by means of an optically active base. However, it is also possible to employ optically active starting materials whereby there is obtained as the end product a corresponding optically active form.

The compounds of the invention are suited for the production of pharmaceutical compositions or preparations. The pharmaceutical compositions or medicines contain one or more of the compounds of the invention as the active material, in a given case in admixture with other pharmacologically or pharmaceutically active materials. The production of the medicine can be accomplished using known and conventional pharmaceutical carriers and adjuvants.

The medicines can be used, for example, enterally, parenterally, orally, perlinqually or in the form of sprays. The administration can take place, for example, in the form of tablets, capsules, pills, dragees, plugs, salves, gels, creams, powders, liquids, dusts or aerosols. As liquids there can be used, for example, oily or aqueous solutions or suspensions, emulsions, or injectable aqueous or oily solutions or suspensions.

The starting materials used for processes (a), (b) and (c) insofar as they are not known can be obtained, for example, in the following ways. Process (a).

A compound having Formula III

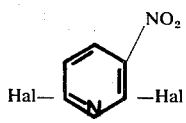  III was reacted with a compound of Formula IV

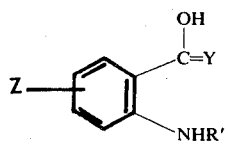  IV where R' is H or alk$_2$ R$_3$ in a solvent such as a lower alcohol, e.g. methanol, ethanol or isopropanol, dioxane or dimethylformamide with addition of an acid binding agent such as potash, sodium carbonate, a tert. amine, e.g. tributyl amine, and similar products to form a compound having Formula V

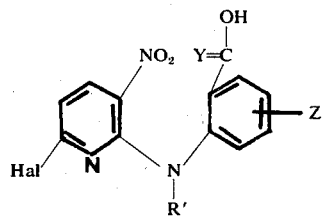  V where R' is H or Alk$_2$ R$_3$ and Hal, Y, Z, Alk$_2$ and R$_3$ are as defined above.

Starting compounds of Formula V wherein Hal is either fluorine or bromine can also be prepared from compounds of Formula V wherein Hal is chlorine are obtained as follows: a compound of Formula V where Hal is Cl is heated with a saturated aqueous-alcoholic ammonia solution in an autoclave at 100° to 120°C. for several hours (2 to 4), the 6-aminopyridine derivative thus formed then is diazotized in known manner and reacted with excess hydrogen halide at 20° to 150°C. or is reacted according to the conditions of the Sandmeyer reaction or modified Sandmeyer reaction in the presence of fluoride or bromide ions and/or the corresponding copper (I) salt (e.g., CuBr, CuI) or fluoborate ions with heat. As solvents there are used water-alcoholic misture, or mixtures of water, dimethyl formamide and dimethyl sulfoxide. For the production of fluorine derivatives this can also be thermally decomposed dry diazonium fluoborate.

Compounds of Formula V in which Hal means a bromine atom can be prepared from compounds which contain a hydroxyl group rather than a halogen atom in the 6-position (for example the 6-hydroxyl groups can be prepared from the corresponding 6-amino compound by the action of nitrous acid) by bromination with a bromination agent such as POBr$_3$, PBr$_5$ or SOBr$_2$, in a given case in an inert medium between 20° and 200°C. The production of compounds of Formula V where Hal is F can also take place in a modified manner by gradually adding Na No$_2$ at a temperature between 0° and 50°C. to a solution in concentrated aqueous hydrofluoric acid of a compound of Formula V which contains an amino group in place of a Hal atom in the 6-position, or by introducing a slow stream of nitrous gases into such solution.

The 2-N-methyl-N-(o-carboxyphenyl-amino) -3-nitro-6-chloropyridine can be obtained, for example, as follows.

EXAMPLE A

A mixture of 116 grams (0.6 mole) of 2,6-dichloro-3-nitropyridine, 90.8 grams (0.6 mole) of N-methyl anthranilic acid, 98 grams of potash and 2000 ml of isopropanol were boiled at reflux for 4 hours, the precipitated potassium salt filtered off with suction, dissolved in 700 ml of water and 86 ml of 96% acetic acid added with stirring. The syrup which came out slowly recrystallized. The material was crystallized from chloroform-benzine, 1:1 by volume. Yield 74 grams M.P. 212°–215°C.

The compounds of Formula V are then reduced, generally by catalytic hydrogenation, whereby the amino compounds of Formula VI

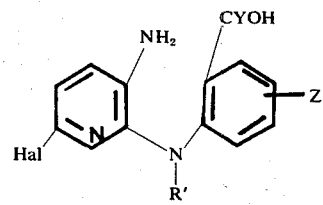  VI are formed, frequently already in admixture with the desired cyclic compound. The cyclization is generally completed by heating.

EXAMPLE B

For example there is hydrogenated with hydrogen 63 grams of the above identified nitropyridine (2-N-methyl-N-(o-carboxyphenylamino)-3-nitro-6-chloropyridine) in a mixture of 250 ml of dioxane and 250 ml of dimethyl formamide with addition of 20 grams of Raney nickel at 65°C. and 50 atms (gauge). The solution at the end of the hydrogenation already contained a product which in part was cyclized to the compound 5 methyl-6-azo-7-chloro-10, 11-dihydro-5H-dibenzo[b,e,]-[1,4] diazepin-11-one. After filtering off the catalyst ring closure was completed by vaporizing the solvent in a vacuum. The material was recrystallized from a large amount of dioxane. Yield 23 grams, M.P. 275°–277°C.

For the production of starting materials having the group $Alk_1N_1R_2$, a compound having Formula V wherein R' is H is reacted with a compound having the formula $X-Alk_1—NR_1R_2$ (X is chlorine or bromine). Thus in example A the N-methylanthranilic acid is replaced by anthranilic acid. The compounds of Formula I which in place of the group $Alk_2—R_3$ have the group $Alk_1NR_1R_2$ can be separated from the byproducts produced by methods such as fractionating crystallization l-chromatography and the like.

Those starting compounds of Formula IV which have not been known previously can be prepared by methods analogous to those that are known for the production of substituted anthranilic acids or substituted anthranilic acids. Thus there can be used the procedures set forth in *Beilsteins Handbuch der Organischen Chemie*, 4th Edition, Vol. 14, pages 325–326 and *Beilsteins Handbuch der Organischen Chemie*, 4th Edition, second supplement, Vol. 14, pages 215–216. The entire disclosure of these two citations is hereby incorporated by reference. Specifically there can be employed the following methods.

1. The direct alkylation of anthranilic acid with the help of dialkyl sulfates or alkylhalides of the formula $Hal\ Alk_2—R_3$ in water at room temperature, *Chem. Berichte*, Vol 37, page 405 the entire disclosure of which is incorporated by reference.

2. The alkylation of anthranilic acid esters with alkylhalides of the formula $Hal\ Alk_2-R_3$, dialkyl sulfates or aliphatic epoxides (2 to 6 carbon atoms) and in a given case subsequently saponifying.

3. The reaction of halobenzoic acids with substituted amines of the formula $R_3Alk_2—NH_2$ which is described for example in Chem. Ber. Vol. 83 (1950), pages 10–13. The entire article is hereby incorporated by reference.

Method 1 can also be modified in such a manner that N-acylated anthranilic acid is reacted with the corresponding alkyl halide or NaH or NaNH₂, in many cases also with NaOH or KOH and other alkaline materials, and subsequently the acyl groups again split off. There has proven especially suitable for this purpose an analogous modification of the method of R. A. W. Johnstone et al, J. Chem. Soc. (London), 1969, pages 2223–4, according to which the aromatic amine is trifluoroacetylated and the subsequent alkylation and acyl splitting off is possible in one operation.

EXAMPLE C

Thus for example 4-chloro-N-methylanthranilic acid (2-methylamino-4-chlorobenzoic acid) can be obtained in the following manner:

100 grams of 2-amino-4-chloro-benzoic acid is dissolved in 300 ml of dioxane and there is dropped in at 25° to 30°C. with stirring and cooling 100 ml of trifluoroacetic anhydride. The reaction product begins to crystallize out even during the reaction; the precipitation is completed by the addition of 500 ml of benzine. Yield: 130 grams of 2-trifluoroacetylamino-4-chlorobenzoic acid, M.P. 140° to 142°C. It is dissolved in 1.5 liters of acetone, 280 grams of methyl iodide added, heated to 45°C. and 50 grams of powdered potassium hydroxide added with stirring, whereupon a slightly exothermic reaction begins and copious crystals separate out. The mixture is stirred for 2 hours at 50° to 55°C., then the acetone distilled off, the residue heated on the water bath for one hour with 500 ml of water, 500 ml of alcohol and 50 grams of KOH. The solution is evaporated to dryness, the residue dissolved in 500 ml of water and acidified with H Cl, whereupon the desired product crystallizes out. Yield 71 grams, M.P. 184° to 185°C.

This last method is especially suited also for alkylation of negatively substituted anthranilic acids. Process (b)

Starting compounds of Formula I having open 5-nitrogen bonds Formula VII

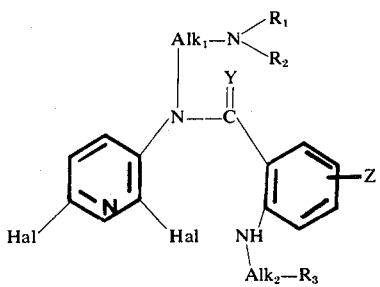

VII are obtained for example by reaction of a compound of Formula VIII

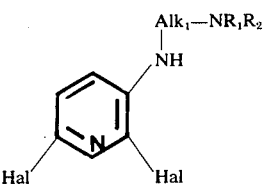

VIII with an anthranilic acid derivative of Formula IX

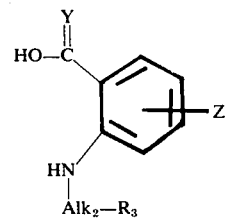

IX wherein in the case where Y is O, the COOH group also can be present in activated form, for example as —CO Cl or —CON₃. Generally such an activation can be undertaken in situ, i.e. a solution of compound of Formula II in the form of the carboxylic acid is reacted, for example, in an inert solvent such as dioxane, tetrahydrofurane, benzene, toluene or a chlorohydrocarbon, as a rule at temperatures between 0° and 50°C., with PCl₅, POCl₃ or SOCl₂ or the corresponding acid hydrazide is reacted with nitrous gases on HNO₂ and, after the dying out of the reaction, component VIII is added. The reaction of VIII and IX, however, can also take place with the addition of condensation agents such as dicyclohexylcarbodiimide or 1-carb-ethoxy-2-ethoxy-1, 2-dihydroquinoline. Compounds of Formula VIII can be obtained from compounds of Formula X.

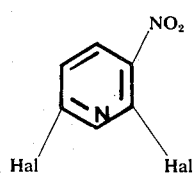

X wherein Hal is a halogen atom as, for example, chlorine, by customary catalytic hydrogenation of the nitro group, acylation of the amino group obtained (as set forth further below) and subsequent reaction of the reaction product with a compound of the formula X-$Alk_1R_1R_2$ where X is chlorine or bromine.

The production of starting materials of Formula XI

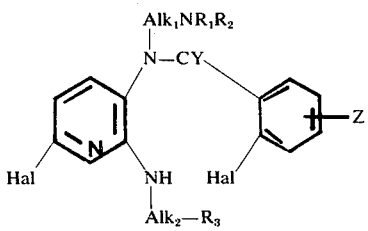

XI takes place in a manner completely analogous to the production of compounds of Formula VII using the corresponding substituted halogen-anthranilic acids or their derivatives of Formula XII

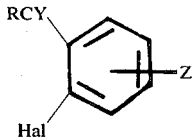

XII where R is OH, Hal (especially Cl or Br), $N_3$ and the corresponding substituted 2, 3-diamino-6-chloropyridines of the Formula XIII

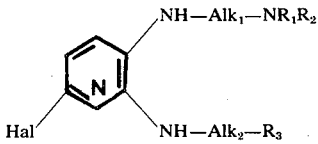

XIII wherein the latter is selectively reacted at the 3-position. The necessary anthranilic acid derivatives of Formula XII are known compounds.

The required substituted pyridines of Formula XIII can be obtained from 2, 6-dichloro-3-nitropyridines by first exchanging the halogen in the 2-position by reaction with an amine of the formula $R_3$—$Alk_2$—$NH_2$ to the residue —NH—$Alk_2$—$R_3$ (analogous to the method given in Belgian Pat. No. 764,794). Compounds in which Hal is for Br can be obtained in a manner analogous to that described about from the corresponding 6-chloro compounds by reaction with $NH_3$ and diazotization. Hereupon the nitro group is reduced, as a rule catalytically, (for example, hydrogenation with hydrogen in dioxane at 50°C. and 50 atm. (gauge) in the presence of Raney nickel) and subsequently there is introduced the radical —$Alk_1$—$NR_1 R_2$ (Hal is preferably chlorine or bromine). Besides the amino group in the 3-position must be acylated and the rest of the procedure is carried out analogous to that described above in the production of substituted athranilic acids.

EXAMPLE D

For example, 2-methylamino-3,-B-dimethylaminoethylamino-6-chloropyridine is obtained as follows:

60 grams of 2-methylamino-3-nitro-6-chloropyridine were hydrogenated in 450 ml of dioxane with 20 grams of Raney nickel at 50°C. at 50 atm (gauge) with hydrogen. The hydrogenation solution was filtered and treated with 40 ml of acetic anhydride with stirring; it was allowed to react further for 30 minutes on the water bath; then the dioxane was evaporated off in a vacuum on a rotary evaporator and the residue crystallized from isopropanol-benzine. Yield 41 grams; M.P. 164°–166°C.

37 grams of the 2-methylamino-3-acetamido-6-chloropyridine thus obtained were dissolved in 400 ml of dry dimethyl formamide, 6 grams of 80% sodium hydride added with stirring under a nitrogen atmosphere, stirred in 15 minutes, then 22 grams of N,N-dimethylaminoethyl chloride added and stirring continued for 2 hours. The dimethyl formamide was evaporated off in a vacuum in a rotary evaporator and the residue (24 grams) boiled at reflux in a mixture of 250 ml of ethanol, 30 grams of KOH and 60 ml of water for 3 hours. The solution was acidified with dilute hydrochloric acid and evaporated to dryness, the residue taken up in water, filtered and made alkaline with KOH. The oil which separated was taken up in ether, the ether solution dried with $MgSO_4$ and evaporated. The syrupy base obtained can be reacted further directly. Yield 20 grams; H Cl salt M.P. 210° to 212°C.

The corresponding pyridyl -(2)-phenylamine can be obtained in known manner by alkylation of the intermediate compound VI wherein R' is $Alk_2$ $NR_1$ $R_2$ (for example, using process (a) ).

However there can also be reacted with each other compounds of formula VIII and IX in inert solvents such as alcohols, e.g. methanol, ethanol or isopropanol, dioxane or tetrahydrofurane with addition of acid acceptors such as potash, pyridine or tertiary amines, e.g. tributylamine, wherein the anthranilic acid derivative IX is present during the reaction as the alkali, e.g. sodium or potassium or ammonium salt. The temperature in this reaction is between 50° and 150°C. An excess of component VIII is suitable to repress the portion of the byproducts in which both halogen atoms of compound VIII have reacted. The end product occurs as the alkali or ammonium salt is heated with dilute acid, e.g. dilute H Cl. In the compounds thus obtained the group —CYOH (especially —COOH or —CSOH) can be converted into an active form, as for example the acid halide, e.g. —COCl or —COBr, or acid alkyl ester group, e.g. —$COOCH_3$ or —$COOC_2H_5$. Process (c)

The starting material of formula II can be obtained for example according to process (a) or (b), (wherein Hal of formula I is hydrogen). The intermediate compound required for this is obtained likewise in a manner analogous to those given for processes (a) and (b), whereby, for example, in compounds III, V, VI and VII likewise Hal is replaced by hydrogen and additionally the pyridine nitrogen can be present in the form of nitrogen oxide.

The 6-N-oxide can be obtained for example from compounds of formula II by reaction with $H_2O_2$, peracids such as peracetic acid or acylperoxides such as benzoyl peroxide, in a given case in a solvent such as acetic acid or chlorohydrocarbons at temperatures between 0° and 100°C.

EXAMPLE 1

5-Methyl-6-aza-7-chloro-10-(B-dimethylaminoethyl)-10,11-dihydro-5H-dibenzo-[b,e,]-[1,4] diazepin-(11)-one

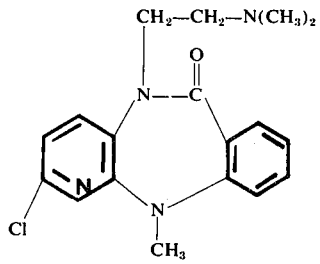

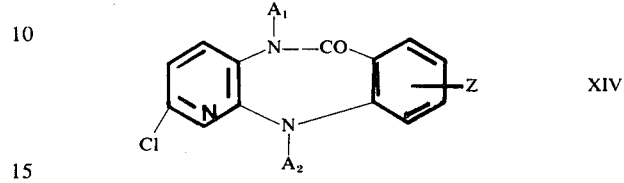

were prepared in a manner analogous to example 1. They are set forth in Table 1 below.

TABLE 1

| Example | Structure formula | | | M.P. and Yield | Starting component 1 in grams compound of formula XIV | Starting component 2 in grams |
|---|---|---|---|---|---|---|
| | $A_1$ | $A_2$ | Z | | | |
| 2 | —CH₂CH₂—N◯O | CH₃ | H | 223–226°C; 18 g (Hydrochloride) | 23 g $A_1$=H, $A_2$=CH₃, Z=H | 13,4 g β-Morpholinoethylchloride |
| 3 | —(CH₂)₃N(CH₃)(CH₃) | CH₃ | H | 180–182°C; 12 g (Base) | 21 g $A_1$=H, $A_2$=CH₃, Z=H | 16 g β-Dimethylaminopropylchloride |
| 4 | —CH₂—CH₂—N◯ | CH₃ | H | 246–248°C; 18 g (Hydrochloride) | 23 g $A_1$=H, $A_2$=CH₃, Z=H | 18 g β-Piperidinoethylchloride |
| 5 | —CH₂—CH₂—N(CH₃)(CH₃) | C₂H₅ | H | 240–242°C; 24 g (Hydrochloride) | 45 g $A_1$=H, $A_2$=C₂H₅, Z=H | 18 g β-Dimethylaminethylchloride |
| 6 | —CH₂CH₂N(CH₃)₂ | CH₃ | 2—CH₃ | 268–270°C; 31 g (Hydrochloride) | 27 g $A_1$=H, $A_2$=CH₃, Z=2—CH₃ | 16 g β-Dimethylaminoethylchloride |
| 7 | —CH₂CH₂N(CH₃)₂ | CH₃ | 2—Cl | 272–274°C; 12 g (Hydrochloride) | 32 g $A_1$=H, $A_2$=CH₃, Z=2—Cl | 18 g β-Dimethylaminoethylchloride |
| 8 | —CH₂CH₂N(CH₃)₂ | CH₃ | 3—Cl | 258–260°C; 14 g (Hydrochloride) | 27 g $A_1$=H, $A_2$=CH₃, Z=3—Cl | 16 g β-Dimethylaminoethylchloride |

16 grams of 5-methyl-6-aza-7-chloro-10,11-dihydro-5H-dibenzo-[b,e]-[1,4] diazepin-(11)-one were dissolved in 350 ml of dimethyl formamide. These were added to the solution with stirring and under nitrogen at room temperature 3.7 grams of 80% sodium hydride and stirring continued for 30 minutes. Thereupon there were dropped in a solution of 7.1 grams of B-dimethylaminoethyl chloride base in some dimethyl formamide. After stirring for 2.5 hours at 80° to 90°C. these were added a further 2 grams of the base and the reaction continued with stirring for a further 1.5 hours with stirring. Then the mixture was concentrated in a vacuum to 100 ml, 500 ml of water added, the mixture extracted several times with ether, the ether extracts evaporated, the residue dissolved in a little isopropanol and acidified with isopropanolic H Cl, whereupon the hydrochloride precipitated. Yield 7 grams; M.P. of the hydrochloride 261°–263°C.

The compounds of examples 2 to 8 of formula XIV

The free base of example 3 was obtained as follows. The hydrochloride obtained in a manner analogous to example 1 was dissolved in methanol and treated with aqueous ammonia, whereupon the free base precipitated in crystalline form.

Examples of other compounds within formula I which can be made by the processes described above are set forth below in Table 2. In Table 2 $A_1$ is

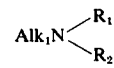

and $A_2$ is $Alk_2$-$R_3$.

TABLE 2

| Example | $A_1$ | $A_2$ | Hal | Y | Z |
|---|---|---|---|---|---|
| 9 | —CH₂N(C₂H₅)(C₂H₅) | —C₂H₅ | Cl | O | H |
| 10 | —(CH₂)₄N(CH₃)(C₂H₅) | —CH₃ | Cl | O | H |

Unless otherwise indicated all parts and percentages are by weight.

TABLE 2-continued

| Example | A₁ | A₂ | Hal | Y | Z |
|---|---|---|---|---|---|
| 11 | —(CH₂)₅N(CH₃)₂ | —C₂H₅ | Cl | O | H |
| 12 | —(CH₂)₆N(CH₃)₂ | —CH₃ | Cl | O | H |
| 13 | —(CH₂)₂N—(CH₂CH₂CH₃)₂ | —C₂H₅ | Cl | O | H |
| 14 | —(CH₂)₂N—(C₄H₉)₂ | —C₂H₅ | Cl | O | H |
| 15 | —(CH₂)₂N—(C₅H₁₁)₂ | —C₂H₅ | Cl | O | H |
| 16 | —(CH₂)₂N—(CHCH₃)₂ with CH₃ | —CH₃ | Cl | O | H |
| 17 | —(CH₂)₂N—(sec. C₄H₉)₂ | —CH₃ | Cl | O | H |
| 18 | —(CH₂)₂N(thiomorpholine, S) | —CH₃ | Cl | O | H |
| 19 | —(CH₂)₃N(pyrrolidine) | —CH₃ | Cl | O | H |
| 20 | —CH₂CH₂N(CH₃)₂ | —C₃H₇ | Cl | O | H |
| 21 | —(CH₂)₃N(CH₃)₂ | —isoC₃H₇ | Cl | O | H |
| 22 | —CH₂CH₂N(C₂H₅)₂ | —C₄H₉ | Cl | O | H |
| 23 | —CH₂CH₂N(CH₃)₂ | —C₅H₁₁ | Cl | O | H |
| 24 | —CH₂CH₂N(CH₃)₂ | —sec. C₄H₉ | Cl | O | H |
| 25 | —CH₂CH₂N(CH₃)₂ | cyclohexyl—CH₂ | Cl | O | H |
| 26 | —CH₂CH₂N(C₂H₅)₂ | cyclopentyl—CH₂CH₂ | Cl | O | H |
| 27 | —CH₂CH₂N(CH₃)₂ | cyclopropyl—CH₂CH₂ | Cl | O | H |
| 28 | —CH₂CH₂N(CH₃)₂ | —CH₂CH₂Cl | Cl | O | H |
| 29 | —CH₂CH₂N(CH₃)₂ | —CH₂CH₂Br | Cl | O | H |
| 30 | —CH₂CH₂N(CH₃)₂ | —CH₂Cl | Cl | O | H |
| 31 | —CH₂CH₂N(CH₃)₂ | —(CH₂)₃Cl | Cl | O | H |
| 32 | —CH₂CH₂N(CH₃)₂ | —(CH₂)₅Cl | Cl | O | H |
| 33 | —CH₂CH₂N(CH₃)₂ | —CH₂CH₂OH | Cl | O | H |
| 34 | —CH₂CH₂N(CH₃)₂ | —(CH₂)₃OH | Cl | O | H |
| 35 | —(CH₂)₃N(CH₃)₂ | —(CH₂)₅OH | Cl | O | H |
| 36 | —(CH₂)₂N(C₂H₅)₂ | —CH₂OH | Cl | O | H |
| 37 | —(CH₂)₂N(CH₃)₂ | —CH₂CH₂F | Cl | O | H |
| 38 | —(CH₂)₂N(piperazine, NH) | —CH₃ | Cl | O | H |
| 39 | —CH₂CH₂N(CH₃)₂ | —CH₃ | Cl | S | H |
| 40 | —CH₂CH₂N(CH₃)₂ | —C₂H₅ | Cl | S | H |
| 41 | —CH₂CH₂CH₂N(C₂H₅)₂ | —C₃H₇ | Cl | S | H |
| 42 | —CH₂CH₂—N(morpholine, O) | CH₃ | Br | S | H |
| 43 | —CH₂CH₂N(pyrrolidine) | CH₃ | Cl | O | H |
| 44 | —CH₂CH₂N(CH₃)₂ | CH₃ | Cl | NH | H |
| 45 | —CH₂CH₂N(C₂H₃)₂ | CH₃ | Cl | NH | H |
| 46 | —CH₂CH₂N(CH₃)₂ | C₂H₅ | F | NH | H |
| 47 | —(CH₂)₃N(CH₃)₂ | CH₃ | F | NH | H |
| 48 | —CH₂CH₂N(CH₃)₂ | CH₃ | Br | NH | H |

TABLE 2-continued

| Example | A₁ | A₂ | Hal | Y | Z |
|---|---|---|---|---|---|
| 49 | —CH₂CH₂N(CH₃)₂ | CH₃ | F | O | H |
| 50 | —(CH₂)₃N(C₂H₅)₂ | C₂H₅ | F | O | H |
| 51 | —(CH₂)₃N | CH₃ | F | O | H |
| 52 | —(CH₂)₅N(CH₃)₂ | CH₃ | F | O | H |
| 53 | —CH₂CH₂N(CH₃)₂ | C₄H₉ | F | O | H |
| 54 | —CH₂CH₂N(CH₃)₂ | CH₃ | Br | O | H |
| 55 | —(CH₂)₃N(C₂H₅)₂ | C₂H₅ | Br | O | H |
| 56 | —CH₂CH₂N(CH₃)₂ | CH₃ | Cl | O | 2—Br |
| 57 | —CH₂CH₂N(CH₃)₂ | C₂H₅ | Cl | O | 2—F |
| 58 | —(CH₂)₃N(CH₃)₂ | CH₃ | Cl | O | 2—C₂H₅ |
| 59 | —CH₂CH₂N(CH₃)₂ | CH₃ | Cl | O | 2—C₅H₉ |
| 60 | —CH₂CH₂N(CH₃)₂ | C₂H₅ | F | O | 3—Br |
| 61 | —CH₂CH₂N—(cyclohexyl)₂ | CH₃ | Cl | O | H |
| 62 | —CH₂CH₂N(CH₃)₂ | CH₃ | Cl | O | 2—NO₂ |
| 63 | —CH₂CH₂N(C₂H₅)₂ | CH₃ | Cl | O | 2—OH |
| 64 | —(CH₂)₃N(CH₃)₂ | C₂H₅ | Cl | O | 3—OH |
| 65 | —(CH₂)₂N(CH₃)₂ | CH₃ | Cl | O | 3—OCH₃ |
| 66 | —(CH₂)₂N(C₂H₅)₂ | CH₃ | Cl | O | 2—OC₂H₅ |
| 67 | —CH₂CH₂N(CH₃)₂ | CH₃ | Cl | O | 2—OC—H₁₁ |
| 68 | —CH₂CH₂N(CH₃)₂ | CH₃ | Cl | O | 1—Cl |
| 69 | —CH₂CH₂N(CH₃)₂ | C₂H₅ | Cl | O | 4—Cl |
| 70 | —CH₂CH₂N(CH₃)₂ | CH₃ | Cl | O | 2—OC₂H₅ |
| 71 | —CH₂CH₂N(CH₃)₂ | CH₃ | Cl | O | 2—C₄H₉ |
| 72 | —CH₂CH₂N(CH₃)₂ | C₂H₅ | Cl | O | 3—sec. C₄ |

The compounds of the invention are suited for the production of pharmaceutical compositions and preparations. The pharmaceutical compositions or drugs contain as the active material one or several of the compounds of the invention, in a given case in admixture with other pharmacologically or pharmaceutically effective materials. The production of the medicine can take place with the use of known and customary pharmaceutical assistants, carriers and diluents.

Such carriers and assistants as set forth for example are those recommended in the following literature as adjuvants for pharmacy, cosmetic and related fields such as in Ullmann's Encyklopadie der technischer Chemie, Vol. 4 (1953), pages 1 to 39; Journal of Pharmaceutical Sciences, Vol. 52 (1963), pages 918 et sec.; H. v. Czetsch-Lindenwald, Hilfstoffe fur Pharmazie und angrenzende Gebiete; Pharm. Ind. Vol. 2 (1961), pages 72 et seq.; Dr. H. P. Fiedler, Lexicon der Hilfstoffe fur Pharmazie, Kosmetik und angrenzende Gebiete, Cantor Kg. Aulendorf i. Wurtt, 1971.

Examples of such materials include gelatin, natural sugars such as sucrose or lactose, lecithin, pectin, starch (for example corn starch), tylose, talc, lycopodium, silica (for example colloidal silica), glucose, cellulose, cellulose derivatives for example cellulose ethers in which the cellulose hydroxyl groups are partially etherified with lower aliphatic alcohols and/or lower saturated oxyalcohols, (for example, methyl hydroxypropyl cellulose, methyl cellulose, hydroxyethyl cellulose), stearates, e.g., methylstearate, and glyceryl stearate, magnesium and calcium salts of fatty acids with 12 to 22 carbon atoms, especially saturated acids (for example calcium stearate, calcium laurate, magnesium oleates, calcium palmitate, calcium behenate and magnesium stearate), emulsifiers, oils and fats, especially of plant origin (for example, peanut oil, castor oil, olive oil, sesame oil, cottonseed oil, corn oil, mono-, di- and triglycerides of saturated fatty acids (C₁₂H₂₄O₂ to C₁₈H₃₆O₂ and their mixtures, e.g , glyceryl monostearate, glyceryl distearate, glyceryl tristearate, glyceryl trilaurate), pharmaceutically compatible mono- or polyvalent alcohols and polyglycols such as glycerine, mannitol, sorbitol, pentaerythritol, ethyl alcohol, diethylene glycol, triethylene glycol, ethylene glycol, propylene glycol dipropylene glycol, polyethylene glycol 400 and other polyethylene glycols, as well as derivatives of such alcohols and polyglycols, esters of saturated and unsaturated fatty acids (2 to 22 carbon atoms, especially 10 to 18 carbon atoms), with mono- (1 to 20 carbon atoms alkanols) or polyhydric alcohols such as glycols, glycerine, diethylene glycol, pentaerythritol, sorbitol, mannitol, ethyl alcohol, butyl alcohol, octadecyl alcohol, etc., e.g., glyceryl stearate, glyceryl palmitate, glycol distearate, glycol dilaurate, glycol diacetate, monoacetin, triacetin, glyceryl oleate, ethylene glycol stearate; such esters of polyvalent alcohols can in a given case also be etherified, benzyl benzoate, dioxolane, glycerine formal, glycol furfural, dimethyl acetamide, lactamide, lactates, e.g., ethyl lactate, ethyl carbonate, silicones (especially middle viscosity dimethyl polysiloxane) and the like.

For the production of solutions there can be used water or physiologically compatible organic solvents, as for example, ethanol, 1,2-propylene glycol, polyglycols, e.g., diethylene glycol, triethylene glycol and dipropylene glycol and their derivatives, dimethyl sulfoxide, fatty alcohols, e.g., stearyl alcohol, cetyl alcohol, lauryl alcohol and oleyl alcohol, triglycerides, e.g., glyceryl oleate, glyceryl stearate, glyceryl palmitate, and glyceryl acetate, partial esters of glycerine, e.g., monoacetic diacetin, glyceryl monostearate, glyceryl distearate, glyceryl monopalmitate, paraffins and the like.

In the production of the preparations there can be used known and conventional solvent aids. As solvent aids there can be used, for example, polyoxyethylated fats, e.g., polyoxyethylated oleo triglyceride, linolized oleotriglyceride. Examples of oleotriglycerides are olive oil, peanut oil, castor oil, sesame oil, cottonseed oil, corn oil (see also Dr. H. P. Fiedler, "Lexikon der Hilfsstoffe fur Pharmazie, Kosmetik und angrenzende Gebiete", 1971, pages 191 to 195.

Polyoxyethylated means that the materials in question contain polyoxyethylene chains whose degree of polymerization is generally between 2 and 40 and especially between 10 and 20. Such materials can be obtained for example by reaction of the corresponding glyceride with ethylene oxide (for example 40 moles of ethylene oxide per mole of glyceride).

Furthermore, there can be added preservatives, stabilizers, buffers, taste correctives, antioxidants and complex formers (for example ethylendiamine tetraacetic acid) and the like. In a given case of stabilization of the active molecule the pH is adjusted to about 3 to 7 with physiologically compatible acids or buffers. Generally, there is preferred as neutral as possible to weak acid (to pH 5) pH value. As antioxidants there can be used for example sodium meta bisulfites, ascorbic acid, gallic acid, alkyl gallates, e.g., methyl gallate and ethyl gallate, butyl hydroxyanisole, nordihydroguararetic acid, tocopherols such as tocopherol and synergists (materials which bind heavy metals by complex formation, for example, lecithin, ascorbic acid, phosphoric acid). The addition of synergists increases considerably the antioxidant activity of tocopherol. As preservatives there can be used for example sorbic acid, p-hydroxybenzoic acid esters (for example lower alkyl esters such as the methyl ester and the ethyl ester benzoic acid), sodium benzoate, trichloroisobutyl alcohol, phenol, cresol, benzethonium chloride and formalin derivatives).

The pharmacological and galenical treatment of the compounds of the invention takes place according to the usual standard methods. For example, the active material or materials and assistants or carriers are well mixed by stirring or homogenization (for example by means of a colloid mill or ball mill), wherein the operation is generally carried out at temperatures between 20 and 80°C., preferably 20 to 50°C.

The drugs can be used for example orally, parenterally, rectally, vaginally, perlingually or locally.

The compounds of the invention have a good antiulcerogen activity (e.g. against stress ulcers, indometacine ulcers, cautery ulcer of the rat and guinea pig).

This activity is comparable to the activity of known medicine Biogastrone.

The lowest effective dosage in the above mentioned animal experiments is for example 20mg/kg body weight orally, 2mg/kg body weight intravenously and 5 mg/kg sublinqually.

As general dosage ranges there can be used 20 to 100 mg/kg body weight orally, 2 to 10 mg/kg body weight intravenously and 10–50 mg/kg sublinqually.

The compounds of the invention have utility in the treatment of stomach and duodenal ulcers.

The pharmaceutical preparations frequently contain between 5 and 20 mg of the active component (or components) of the invention.

The compounds can be delivered in the form of tablets, capsules, pills, dragees, suppositories, salves, gels, creams, powders, liquids, dusts or aerosols. As liquids there can be used oily or aqueous solutions or suspensions, emulsions. The preferred forms of use are as solutions which contain between 50 and 750 mg of active material or solutions which contain between 1 and 5% of active material.

In individual doses the amount of active component of the invention can be used for example in an amount of a. in oral dispensation between 20 and 200 mg,
b. in parenteral dispensation (for example intravenously, intramuscularly) between 2 and 50 mg,
c. in inhalation dispensation (solutions or aerosols) between 10 and 50 mg,
d. in rectal or vaginal dispensation between 5 and 10 mg,
e. in dispensation by local application to the skin and mucous membranes (for example in the form of solutions, lotions, emulsions, salves, etc.) between 10 and 100 mg.

(The dosages in each case are based on the free base).

For example, there is recommended the use of 1 to 3 tablets containing 10 to 50 mg of active ingredient 3 times daily or for example intravenously the injection 1 to 3 times daily of a 1 to 2 ml ampoule containing 2 to 10 mg of active substance. In oral preparations the minimum daily dosage for example is 50 mg; the maximum daily dosage should not be over 450 mg.

In the treatment of dogs and cats the oral invidiual dosage in general is between about 10 and 50 mg/kg body weight; the parenteral individual dosage is between about 2 and 10 mg/kg body weight. In the treatment of horses and cattle the individual dosage orally is generally between 50 and 100 mg/kg; the parenteral individual dosage is between 10 and 50 mg/kg body weight.

The acute toxicity of the compounds of the invention in the mouse (expressed by the LD 50 mg/kg method of Miller and Tainter, Proc. Soc. Exper. Biol. and Med., Vol. 57 (1944) pages 261 et seq.) in oral application is above 400 mg/kg for example 2000 mg/kg).

The drugs can be used in human medicine, in veterinary medicine, e.g., to treat cats, dogs, horses, sheep, cattle, goats and pigs or in agriculture. The drugs can be used alone or in admixture with other pharmacologically active materials.

The free acids can also be used as curing agents for melamine-formaldehyde resins.

What is claimed is:

1. Aza-10, 11-dihydro-5H-dibenzo[b,e]-[1,4] diazepines of the formula

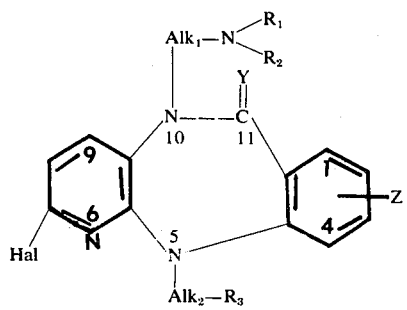

where Alk$_1$ and Alk$_2$ are alkylene groups of 1 to 6 carbon atoms, R$_1$ and R$_2$ individually are alkyl groups of 1 to 5 carbon atoms or together with the adjacent nitrogen atom form a piperidinyl, pyrrolidinyl, morpholino, piperazinyl or homopiperazinyl, R$_3$ is hydrogen, a hydroxyl group, a cycloalkyl group with 3 to 6 carbon atoms or a halogen atom, Hal is a halogen atom, Y is an oxygen atom, sulfur atom, or an NH group and Z is a hydrogen atom, an alkyl group with 1 to 5 carbon atoms, a halogen atom, a hydroxy group, a nitro group or an —OR group or pharmacologically acceptable salts thereof.

2. A compound according to claim 1 wherein the halogen atoms present are F, Cl or Br.

3. A compound according to claim 2 wherein the halogen atoms are F or Cl.

4. A compound according to claim 2 wherein any alkyl group present has 1 to 4 carbon atoms.

5. A compound according to claim 2 wherein Y is O.

6. A compound according to claim 2 wherein when

is a ring it is morpholino or piperidino.

7. A compound according to claim 2 wherein Alk$_1$ is alkylene of 2 to 3 carbon atoms, Alk$_2$ is alkylene of 1 to 2 carbon atoms, R$_1$ and R$_2$ individually are methyl or together are morpholino or piperidino, R$_3$ is hydrogen, Y is oxygen, Z is H, methyl or chloro.

8. A compound according to claim 7 wherein Hal is chlorine.

9. A compound according to claim 2 wherein Alk$_1$ is alkylene of 1 to 3 carbon atoms, alk$_2$ is alkylene of 1 to 3 carbon atoms, R$_1$ and R$_2$ individually are alkyl groups of 1 to 4 carbon atoms or together with the adjacent nitrogen atom form a morpholino or piperidino ring, R$_3$ is hydrogen, Z is hydrogen, an alkyl group of 1 to 4 carbon atoms or a halogen atom.

10. A compound according to claim 9 wherein Y is O.

11. A compound according to claim 2 wherein any halogen atom present is Cl.

12. A compound according to claim 11 wherein any alkyl group present has 1 to 4 carbon atoms.

13. A compound according to claim 11 wherein Y is O.

14. A compound according to claim 10 wherein any halogen atom present is chlorine.

* * * * *

UNITED STATES PATENT OFFICE
CERTIFICATE OF CORRECTION

Patent No. 3,917,585　　　　　　Dated November 4, 1975

Inventor(s) WALTER VON BEBENBURG

It is certified that error appears in the above-identified patent and that said Letters Patent are hereby corrected as shown below:

IN THE CLAIMS

Column 19, line 25, after group insert:

--where R is an alkyl group of 1 to 5 carbon atoms--.

Signed and Sealed this

Twenty-fourth Day of August 1976

[SEAL]

Attest:

RUTH C. MASON
Attesting Officer

C. MARSHALL DANN
Commissioner of Patents and Trademarks